United States Patent [19]
Orzel et al.

[11] Patent Number: 5,653,102
[45] Date of Patent: Aug. 5, 1997

[54] AIR/FUEL CONTROL SYSTEM WITH CATALYTIC CONVERTER MONITORING FOR A VARIABLE DISPLACEMENT ENGINE

[75] Inventors: Daniel V. Orzel, Westland; Glenn Alden Zimlich, Dearborn Heights; David Karl Bidner, Livonia, all of Mich.

[73] Assignee: Ford Global Technologies, Inc., Dearborn, Mich.

[21] Appl. No.: 522,008

[22] Filed: Aug. 31, 1995

[51] Int. Cl.$^6$ ................................................ F01N 3/20
[52] U.S. Cl. ........................... 60/274; 60/276; 60/277; 60/285; 123/198 F; 123/481
[58] Field of Search ....................... 60/274, 276, 277, 60/285; 123/481, 198 F

[56]  References Cited

U.S. PATENT DOCUMENTS

| | | | |
|---|---|---|---|
| 4,024,850 | 5/1977 | Peter | 123/198 F |
| 4,165,610 | 8/1979 | Iizuka | 60/285 |
| 4,201,180 | 5/1980 | Iizuka | 60/276 |
| 5,115,639 | 5/1992 | Gopp . | |
| 5,357,751 | 10/1994 | Orzel . | |
| 5,408,966 | 4/1995 | Lipinski et al. . | |
| 5,481,461 | 1/1996 | Miyamoto | 60/276 |

Primary Examiner—Douglas Hart
Attorney, Agent, or Firm—Allan J. Lippa

[57]  ABSTRACT

A control system and method for indicating the efficiency of a catalytic converter coupled to a variable displacement engine. A preselected group of cylinders is activated in a first engine operating and all cylinders are activated during a second engine operating mode. A converter test period is provided when a count in output transitions of the upstream sensor reaches a first preselected value while operating in the first mode and count in transitions of the upstream sensor reaches a second preselected value while operating in the second mode. Converter efficiency is generated by computing a ratio of upstream sensor counts to downstream sensor counts during the test period.

11 Claims, 6 Drawing Sheets

AIR/FUEL CONTROL SYSTEM WITH CATALYTIC CONVERTER MONITORING FOR A VARIABLE DISPLACEMENT ENGINE

FIELD OF THE INVENTION

The invention relates to air/fuel control systems with catalytic converter monitoring for variable displacement engines.

BACKGROUND OF THE INVENTION

Air/fuel control systems are known which are responsive to exhaust gas oxygen sensors positioned both upstream and downstream of the catalytic converter such as shown in U.S. Pat. No. 5,115,639. It is also known to use a ratio in switching transitions of the upstream and downstream sensors to provide an indication of converter efficiency such as shown in U.S. Pat. No. 5,357,751.

The inventors herein have recognized numerous problems with the above approaches when catalytic converter monitoring is applied to variable displacement engines. For example, when operating an 8-cylinder engine with only 4 cylinders combusting under light engine load, variations in manifold pressures and exhaust gas pulsations between the 4 VS. 8 cylinders modes results in a different frequency of transitions in the output of the exhaust gas oxygen sensors. Accordingly, prior approaches to monitoring the efficiency of the converter would provide inaccurate results when groups of engine cylinders are disabled.

SUMMARY OF THE INVENTION

An object of the invention herein is to provide monitoring of the catalytic converter efficiency when groups of engine cylinders are disabled.

The above object is achieved, and problems of prior approaches overcome, by providing both a system and control method for an engine having a catalytic converter and first and second exhaust gas oxygen sensors respectively positioned upstream and downstream of the converter in the engine exhaust stream. In one particular aspect of the invention, the method comprised the steps of: activating a preselected group of cylinders in a first engine operating mode and activating all engine cylinders in a second engine operating mode; providing a converter test period when a count in output transitions of the upstream sensor reaches a first preselected value while operating in the first mode and a count in transitions of the upstream sensor reaches a second preselected value while operating in the second mode; generating an upstream count by counting the output transitions of the upstream sensor during the test period; generating a downstream count by counting output transitions of the downstream sensor during the test period; and indicating converter efficiency from a ratio of the downstream count to the upstream count during the test period.

An advantage of the above aspect of the invention is that accurate efficiency of the catalytic converter is provided regardless of the number of engine cylinders which may be deactivated.

BRIEF DESCRIPTION OF THE DRAWINGS

The object and advantages of the invention described herein will be more clearly understood by reading an example of the embodiment in which the invention is used to advantage with reference to the attached drawings.

DESCRIPTION OF AN EMBODIMENT

Figure 1:
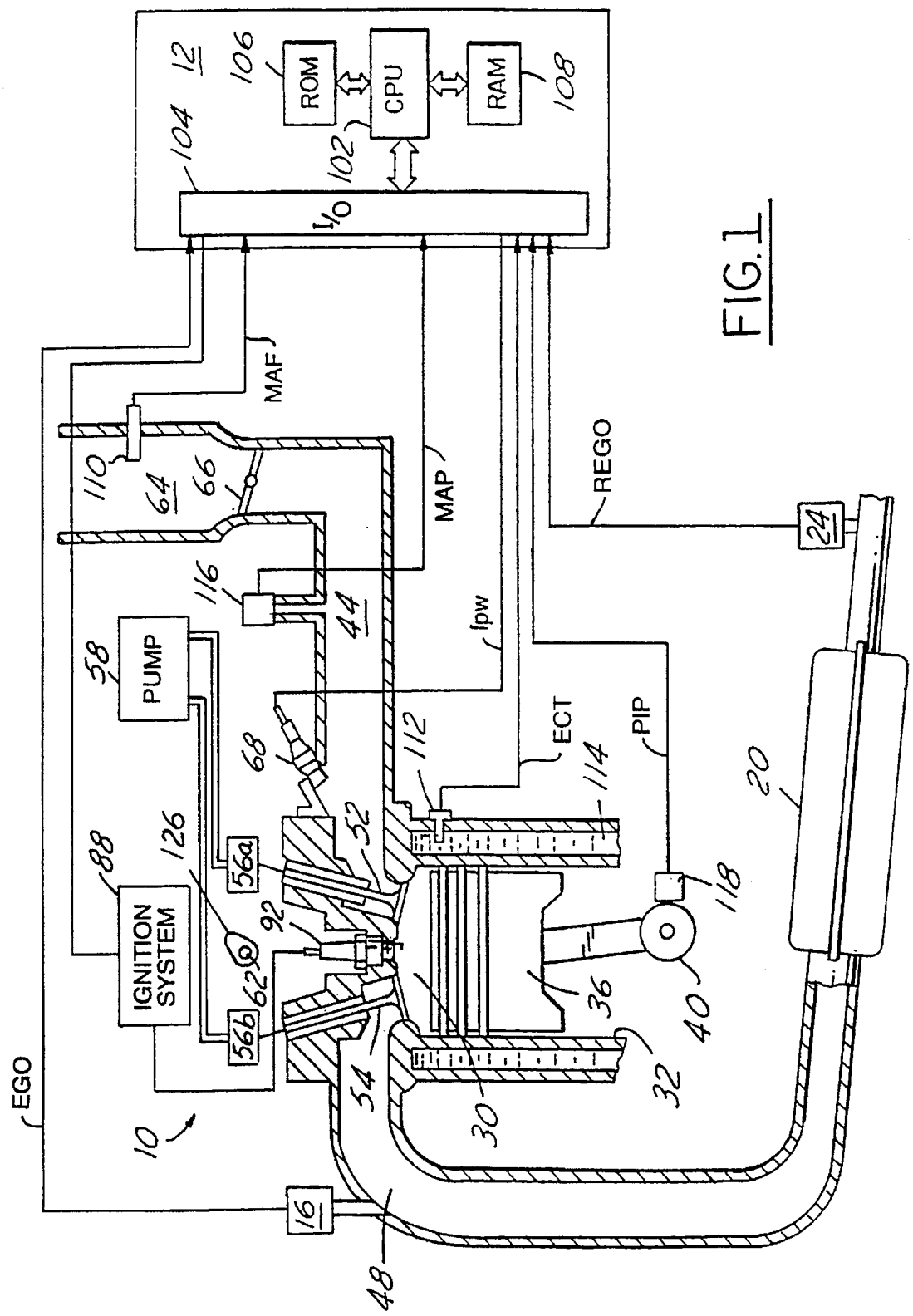
FIG. 1 is a block diagram of a embodiment in which the invention is used to advantage.

Variable displacement internal combustion engine 10 comprising a plurality of cylinders, one cylinder of which is shown in FIG. 1, is controlled by electronic engine controller 12.

Catalytic type exhaust gas oxygen sensor 16 is shown coupled to exhaust manifold 48 upstream of catalytic converter 20. Sensor 16 provides signal EGO to controller 12 which converts signal EGO into two-state signal EGOS. A high voltage state of signal EGOS indicates exhaust gases are rich of a desired air/fuel ratio and a low voltage state of converted signal EGO indicates exhaust gases are lean of the desired air/fuel ratio. Typically, the desired air/fuel ratio is selected as stoichiometry which falls within the peak efficiency window of catalytic converter 20. Another catalytic type exhaust gas oxygen sensor 24 is shown coupled to the engine exhaust downstream of catalytic converter 20. Sensor 24 provides signal REGO to controller 12 which converts signal REGO into two-state signal REGOS. In general terms which are described later herein with particular reference to FIGS. 4–6, controller 12 controls engine air/fuel ratio in response to signals EGOS and REGOS.

Continuing with FIG. 1, engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54 each having a valve stem communicating with respective valve deactivation units 56a and 56b which are coupled to cam lobe 126 of camshaft 62. As described in greater detail later herein with reference to FIGS. 2 and 4, hydraulic pump 58 is supplies hydraulic fluid to valve deactivation units 56a and 56b in response to a deactivation signal from controller 12.

Intake manifold 44 is shown communicating with throttle body 64 via throttle plate 66. Intake manifold 44 is also shown having fuel injector 68 coupled thereto for delivering liquid fuel in proportion to the pulse width of signal FPW from controller 10. Fuel is delivered to fuel injector 68 by a conventional fuel system (not shown) including a fuel tank, fuel pump, and fuel rail (not shown).

Conventional distributorless ignition system 88 provides ignition spark to combustion chamber 30 via spark plug 92 in response to controller 12.

Controller 12 is shown in FIG. 1 as a conventional microcomputer including: microprocessor unit 102, input/output ports 104, electronic memory chip 106 which is an electronically programmable memory in this particular example, random access memory 108, and a conventional data bus. Controller 12 is shown receiving various signals from sensors coupled to engine 10, in addition to those signals previously discussed, including: measurements of inducted mass air flow (MAF) from mass air flow sensor 110 coupled to throttle body 58; engine coolant temperature (ECT) from temperature sensor 112 coupled to cooling sleeve 114; a measurement of manifold pressure (MAP) from manifold pressure sensor 116 coupled to intake manifold 44; and a profile ignition pickup signal (PIP) from Hall effect sensor 118 coupled to crankshaft 40.

In the particular example presented herein, engine 10 is an eight cylinder engine, and controller 12 provides a valve deactivation signal to intake valve deactivation units 56a and exhaust valve deactivation units 56b of four of the eight cylinders when an indication of engine load is less than a preselected load. The preselected load in this example is mapped as a function of engine speed (rpm), and manifold pressure (MAP). Concurrently, controller 12 deactivates fuel delivery and ignition timing through ignition system 88 to the four deactivated cylinders.

Figure 2:
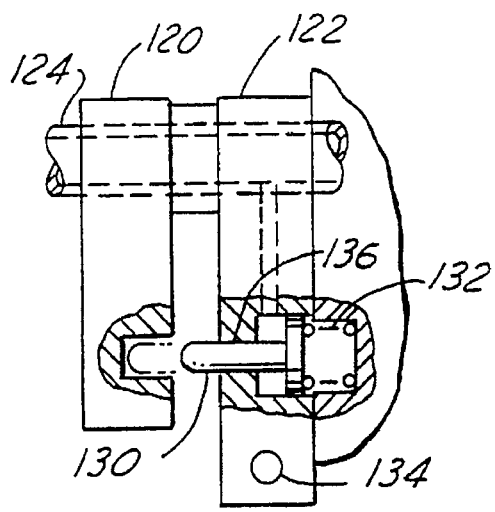
FIGS. 2 and 3 are cross sectional views of a portion of the embodiment shown in FIG. 1.
Figure 3:
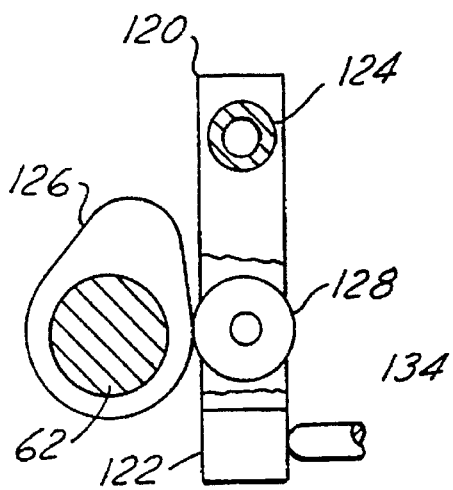

Valve deactivation units 56a and 56b have identical parts and identical operation to the valve deactivation unit shown in FIGS. 2 and 3 which is now described. Rocker arm 122, which is operatively associated with valve stem 134 which may be part of either intake valve 52 or an exhaust valve 54, responds to the urgings of cam lobe 126 only when hydraulic camshaft follower 120, which is mounted to a common rocker shaft 124 is engaged with rocker arm 122, which occurs when spring loaded pin 130 is projected from rocker arm 122 into follower 20. Upon receipt of a deactivation signal from controller 12, the appropriate high pressure hydraulic oil from hydraulic pump 58 is routed to a pair of rocker arms 122 corresponding to the selected cylinder. Then, pins 130 will be retracted into the corresponding rocker arms 122 and the valves for the selected cylinder will be deactivated. When hydraulic pressure is turned off, the hydraulic pressure forcing pin 130 into its retracted position within rocker arm 122 will decay and spring 132 will cause follower 120 and rocker arm 122 to become engaged, with the result that the cylinder will become activated. Those skilled in the art will appreciate in view of this disclosure that an engine having two valves per cylinder will require two cam followers 120; engines having more than two valves will require additional cam followers for each cylinder. Those skilled in the art will further appreciate that pins 130 could be projected to the cam follower engaging position by means of hydraulic pressure and retracted by spring force.

Figure 4:
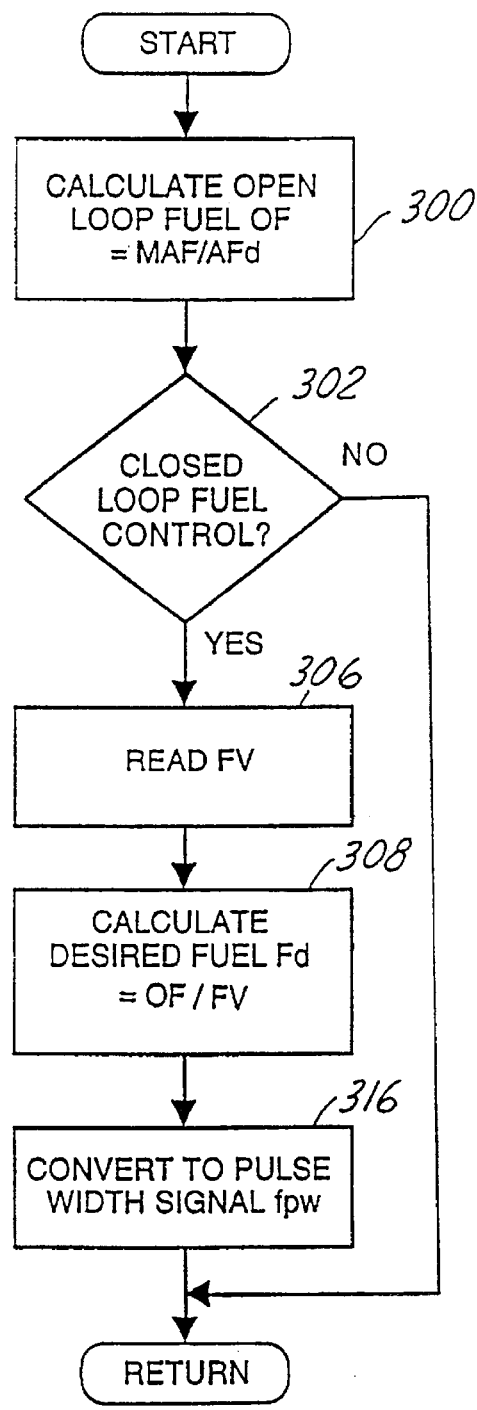
FIGS. 4, 5, 6, 7 and 8 are flowcharts of various operations performed by a portion of the embodiment shown in FIG. 1.

The liquid fuel delivery routine executed by controller 12 for controlling engine 10 is now described beginning with reference to the flowchart shown in FIG. 4. An open loop calculation of desired liquid fuel (signal OF) is calculated in step 300. More specifically, the measurement of inducted mass airflow (MAF) from sensor 110 is divided by a desired air/fuel ratio (AFd) which, in this example, is correlated with stoichiometric combustion. A determination is made that closed loop or feedback control is desired (step 302), by monitoring engine operating parameters such as temperature ECT. Desired fuel quantity, or fuel command, for delivering fuel to engine 10 is generated by dividing feedback variable FV into the previously generated open loop calculation of desired fuel (signal OF) as shown in step 308. Fuel command or desired fuel signal Fd is then converted to pulse width signal fpw (step 316) for actuating fuel injector 68.

Figure 5:
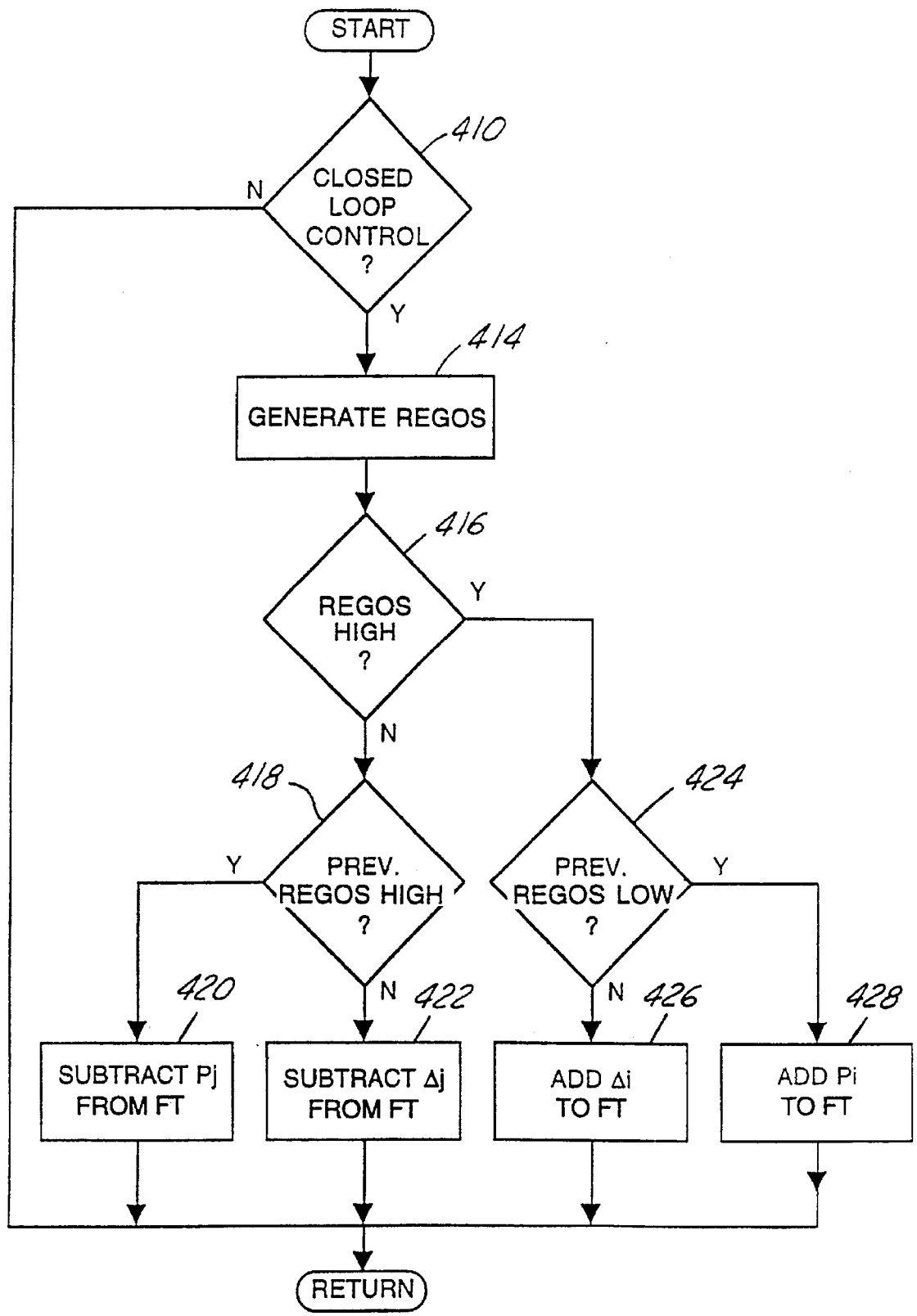

The routine executed by controller 12 to generate fuel trim signal FT is now described with reference to the flowchart shown in FIG. 5. Signal EGO is read, after determining that closed loop air/fuel control is desired in step 410, and converted to two-state signal REGOS (414) as previously described. When signal REGO is low (step 416), but was high during the previous background loop of controller 12 (step 418), preselected proportional term Pj is subtracted from fuel trim signal FT (step 420). When signal REGOS is low (step 416), and was also low during the previous background loop (step 418), preselected integral term $\Delta j$, is subtracted from fuel trim signal FT (step 422).

Similarly, when signal REGOS is high (step 416), and was also high during the previous background loop of controller 12 (step 424), integral term $\Delta i$, is added to fuel trim signal FT (step 426). When signal REGOS is high (step 416), but was low during the previous background loop (step 424), proportional term Pi is added to fuel trim signal FT (step 428).

In accordance with the above described operation, fuel trim signal FT is generated from a proportional plus integral controller (PI) responsive to exhaust gas oxygen sensor 24. The integration steps for integrating signal REGOS in a direction to cause a lean air/fuel correction are provided by integration steps $\Delta i$, and the proportional term for such correction provided by $P_i$. Similarly integral term $\Delta j$ and proportional term $P_j$ cause rich air/fuel correction.

Figure 6:
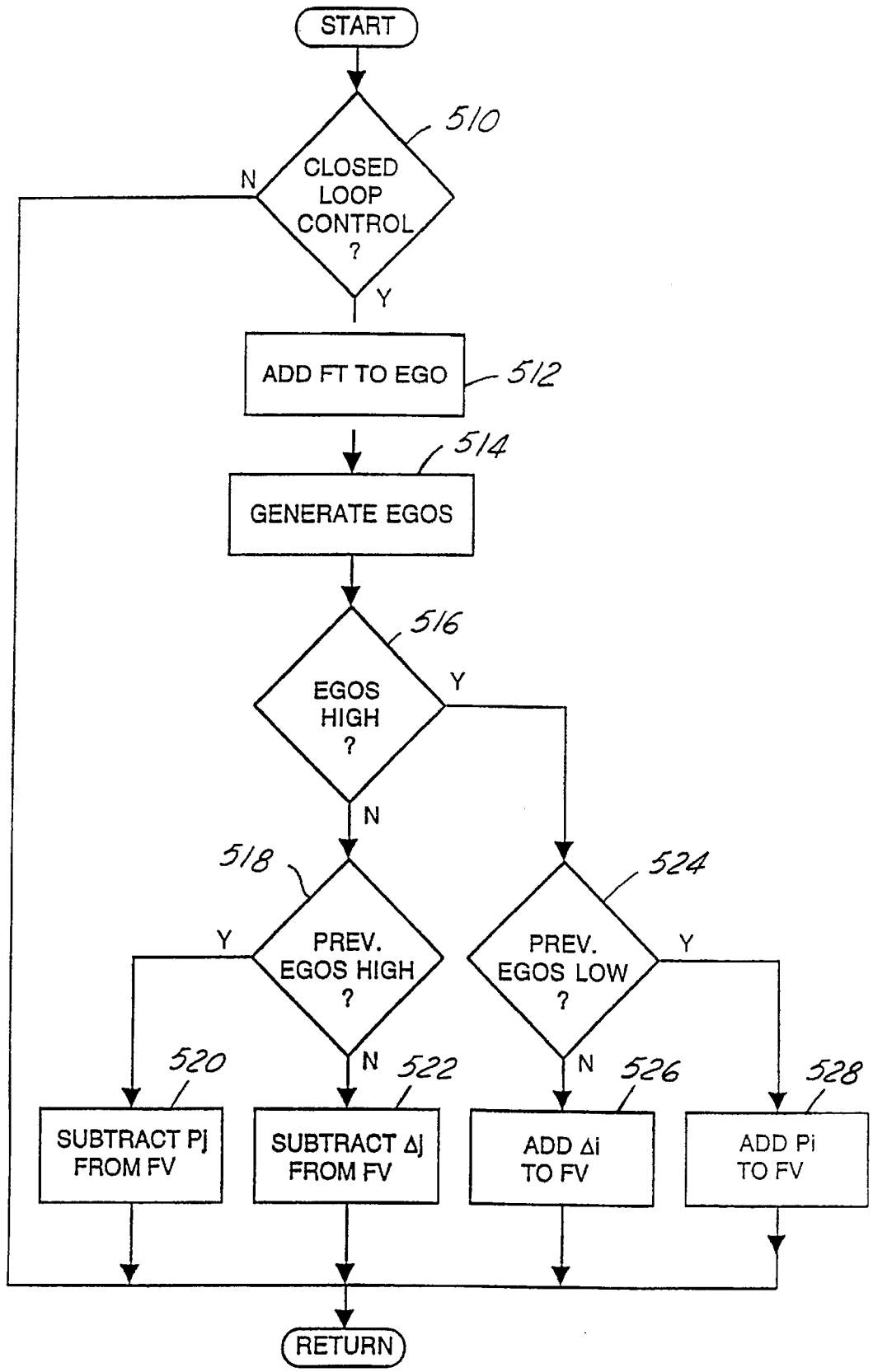

The air/fuel feedback routine executed by controller 12 to generate fuel feedback variable FV is now described with reference to the flowchart shown in FIG. 6. Fuel trim signal FT is added to signal EGO (512), after determining that closed loop air/fuel control is desired in step 510. Two-state signal EGOS is then generated from trimmed signal EGO (514). When signal EGOS is low (step 516), but was high during the previous background loop of controller 12 (step 518), preselected proportional term Pj is subtracted from feedback variable FV (step 520). When signal EGOS is low (step 516), and was also low during the previous background loop (step 518), preselected integral term $\Delta j$, is subtracted from feedback variable FV (step 522).

Similarly, when signal EGOS is high (step 516), and was also high during the previous background loop of controller 12 (step 524), integral term $\Delta i$, is added to feedback variable FV (step 526). When signal EGOS is high (step 516), but was low during the previous background loop (step 524), proportional term Pi is added to feedback variable FV (step 528).

In accordance with the above described operation, feedback variable FV is generated from a proportional plus integral controller (PI) responsive to exhaust gas oxygen sensor 16. The integration steps for integrating signal EGOS in a direction to cause a lean air/fuel correction are provided by integration steps Di, and the proportional term for such correction provided by $P_i$. Similarly integral term Dj and proportional term $P_j$ cause rich air/fuel correction.

Figure 7:
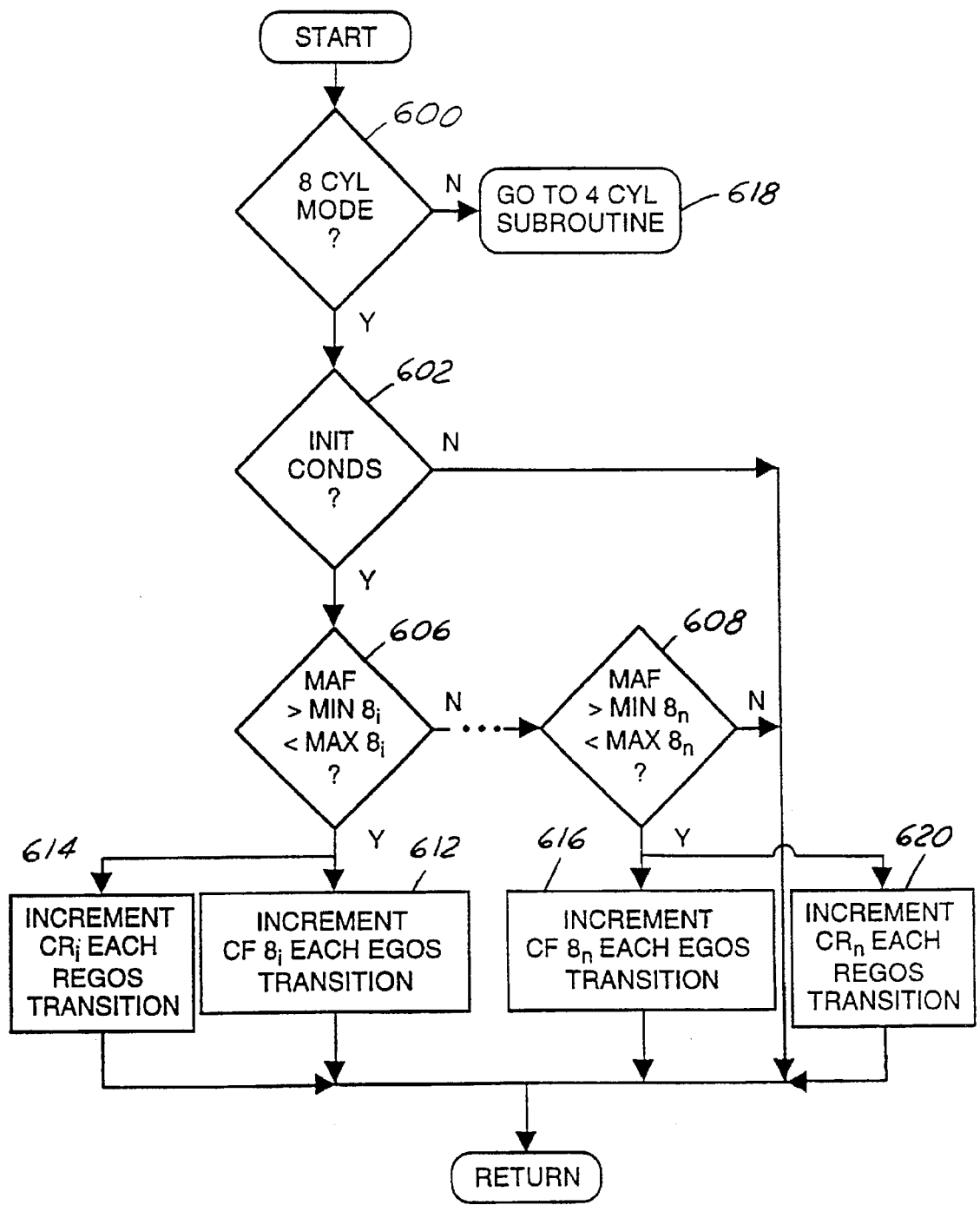

Reference is now made to the flowchart shown in FIG. 7. When controller 12 places engine 10 in an 8-cylinder mode of engine operation (600), and initial conditions for monitoring of the emissions system including catalytic converter 20 are present (602) inducted airflow signal MAF is read to determine which of "n" inducted airflow ranges engine 10 is operating in. For example, inducted airflow MAF is in the "i" airflow range when it is greater than minimum value $MIN8_i$ and less than maximum value $MAX8_i$ (606). Similarly, engine operation occurs during the "n" inducted airflow signal MAF is greater than the corresponding minimum value for the "n" airflow range ($MIN8_n$) and less than maximum value $MAX8_n$ (608).

When engine 10 is operating in the 8-cylinder mode and is also operating in the "i" airflow range, count $CF8_i$ is incremented each transition in voltage state of signal EGOS (612). Count $Cr_i$ is also incremental each transition of signal REGOS (614). Similarly, when engine 10 is operating in the 8-cylinder mode and is operating in the "n" airflow range, count $CF8_n$ is incremented each transition of signal EGOS (616). And count $Cr_n$ is incremented each transition of signal REGOS (620).

Figure 8:
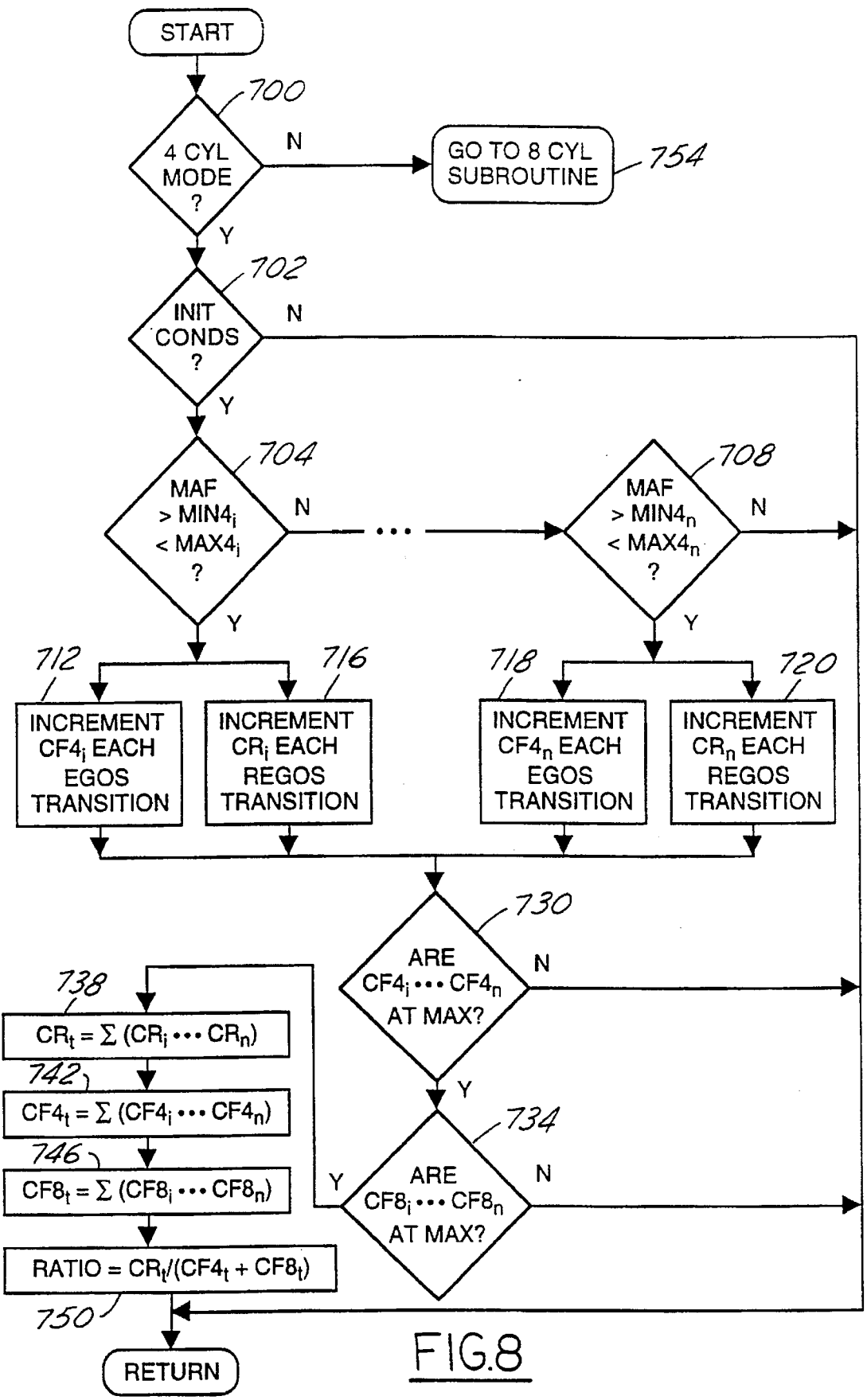

During operation in the 4-cylinder mode (618), the 4-cylinder subroutine shown in FIG. 8 is commenced at step 700. Once again, when initial conditions are present (702), such as engine coolant temperature ECT above a predetermined value, inducted airflow signal MAF is sampled to determine which of "n" airflow ranges engine 10 is operating in. When engine 10 is operating in the "i" airflow range (704), count value $CF4_i$ is incremented each transition of signal EGOS (712) and count $CR_i$ is incremented each transition of signal REGOS (716). When engine 10 is operating in the 4-cylinder mode and within the "n" airflow range (708), count $CF4_n$ is incremented each transition of signal EGOS (718) and count $CR_n$ is incremented each transition of signal REGOS (720).

Efficiency of catalytic converter 20 is determined in steps 738–750, when each of the counts for the "n" airflow ranges associated with 4-cylinder operation (730), and each of the counts for the "n" airflow ranges associated with 8-cylinder operation (734), are at their respective maximum values. More specifically, the efficiency of catalytic converter 20 is determined after each count $CF4_i \ldots CF4_n$ is at its respective maximum value (730), and each count $CF8_i \ldots CF8_n$ is at its respective maximum value (734).

Thereafter, the total count ($CR_t$) associated with exhaust gas oxygen sensor switching downstream of converter 20 is generated in step 738. More specifically, total count $CR_t$ is generated by summing each total count of transitions is signal REGOS for the "n" inducted airflow ranges. Stated another way, total count $CR_t$ is generated by summing counts $CR_i \ldots CR_n$ (738).

A total count in transitions of signal EGOS for the "n" airflow ranges which engine 10 is operating in the 4-cylinder mode is generated during step 742 thereby providing total count $CF4_t$. More specifically, total count $CF4_t$ is generated by summing count $CF4_i \ldots CF4_n$ for each of the "n" airflow ranges (742).

Total count in transitions $CF8_t$ for each transition of signal EGOS for each of the "n" airflow ranges when engine 10 is operating in the 8-cylinder mode is generated during step 746. Stated another way, total count $CF8_t$ is generated by summing counts $CF8_i \ldots CF8_n$ for each of the "n" airflow ranges (746).

Efficiency of catalytic converter 20 is then determined by signal RATIO which is the ratio of total count $CR_t$ to the sum of $CF4_t$ plus $CF8_t$ (750). Stated another way, the ratio is the ratio of total transitions of signal REGOS to the sum of transitions in signal EGOS for both the 4 cylinder and 8-cylinder modes of operation is computed by summing subtotals corresponding to each of the "n" airflow ranges.

An example of operation has been presented wherein catalyst efficiency is determined by equally weighting operation during both the 4 cylinder and 8 cylinder engine operating modes. Further, each of the "n" airflow ranges has been equally weighted in the particular example presented herein. The invention claim herein, however, may be used to advantage by weighting the 4 cylinder mode of operation differently from the 8 cylinder mode of operation. Further, the different airflow ranges may be weighted differently within the 4 cylinder or 8 cylinder modes of operation. Other modifications will become apparent to those skilled in the art without departing from the spirit and scope of the invention claimed herein. Accordingly, the inventors herein intend that the invention be defined only by the following claims.

We claim:

1. A control method for an engine having a catalytic converter and first and second exhaust gas oxygen sensors respectively positioned upstream and downstream of the converter in the engine exhaust stream, comprising the steps of:

activating a preselected group of cylinders in a first engine operating mode and activating all engine cylinders in a second engine operating mode;

providing a converter test period when a count in output transitions of the upstream sensor reaches a first preselected value while operating in said first mode and a count in transitions of the upstream sensor reaches a second preselected value while operating in said second mode;

generating an upstream count by counting said output transitions of the upstream sensor during said test period;

generating a downstream count by counting output transitions of the downstream sensor during said test period; and indicating converter efficiency from a ratio of said downstream count to said upstream count during said test period.

2. The method recited in claim 1 further comprising the step of adjusting fuel delivered to the engine in response to a feedback variable derived from said first exhaust gas oxygen sensor.

3. The method recited in claim 2 wherein said feedback variable is trimmed by a trim signal generated from said second exhaust gas oxygen sensor.

4. The method recited in claim 2 wherein said engine comprises an eight cylinder engine and said preselected group of cylinders comprises four cylinders.

5. The method recited in claim 4 wherein said first engine operating mode and said second engine operating mode are entered as a function of engine load.

6. A control method for an engine having a catalytic converter and first and second exhaust gas oxygen sensors respectively positioned upstream and downstream of the converter in the engine exhaust stream, comprising the steps of:

activating a preselected group of cylinders in a first engine operating mode and activating all engine cylinders in a second engine operating mode;

providing a converter test cycle when the engine has completed operation in a first plurality of inducted airflow ranges for at least a first minimum duration in each of said first airflow ranges while operating in said first mode and the engine has also completed operation in a second plurality of inducted airflow ranges for at least a second minimum duration in each of said second airflow ranges while operating in said second mode;

generating each of said first minimum durations when a count in output transitions of the upstream sensor reaches a first preselected count while operating in each of said first airflow ranges of said first mode and generating each of said second minimum durations when a count in output transitions of the upstream sensor reaches a second preselected count while operating in each of said second airflow ranges of said second mode;

generating an upstream count by counting said output transitions of the upstream sensor during said test period;

generating a downstream count by counting output transitions of the downstream sensor during said test period; and indicating converter efficiency from a ratio of said downstream count to said upstream count during said test period.

7. The method recited in claim 6 wherein said first minimum duration and said second minimum duration are equal.

8. The method recited in claim 6 wherein said first preselected count and said second preselected count are equal.

9. An electronic memory containing a computer program to be executed by an engine controller which controls an engine having a catalytic converter and first and second exhaust gas oxygen sensors respectively positioned upstream and downstream of the converter in the engine exhaust stream, comprising:

activation means for activating a preselected group of cylinders in a first engine operating mode and activating all engine cylinders in a second engine operating mode;

test cycle means for providing a converter test cycle when the engine has completed operation in a first plurality of inducted airflow ranges for at least a first minimum duration in each of said first airflow ranges while operating in said first mode and the engine has also completed operation in a second plurality of inducted airflow ranges for at least a second minimum duration in each of said second airflow ranges while operating in said second mode;

duration means for generating each of said first minimum durations when a count in output transitions of the upstream sensor reaches a first preselected count while operating in each of said first airflow ranges of said first mode and generating each of said second minimum durations when a count in output transitions of the upstream sensor reaches a second preselected count while operating in each of said second airflow ranges of said second mode;

upstream count means for generating an upstream count by counting said output transitions of the upstream sensor during said test period;

downstream count means for generating a downstream count by counting output transitions of the downstream sensor during said test period; and converter indicating means for or indicating converter efficiency from a ratio of said downstream count to said upstream count during said test period.

10. The electronic memory recited in claim 9 further comprising adjusting means adjusting fuel delivered to the engine in response to a feedback variable derived from said first exhaust gas oxygen sensor.

11. The electronic memory recited in claim 10 wherein said adjusting means trims said feedback variable by a trim signal generated from said second exhaust gas oxygen sensor.

* * * * *